(No Model.)
G. B. & F. C. HOYT.
SPRING BALANCE COMPUTING SCALE.
No. 588,748. Patented Aug. 24, 1897.
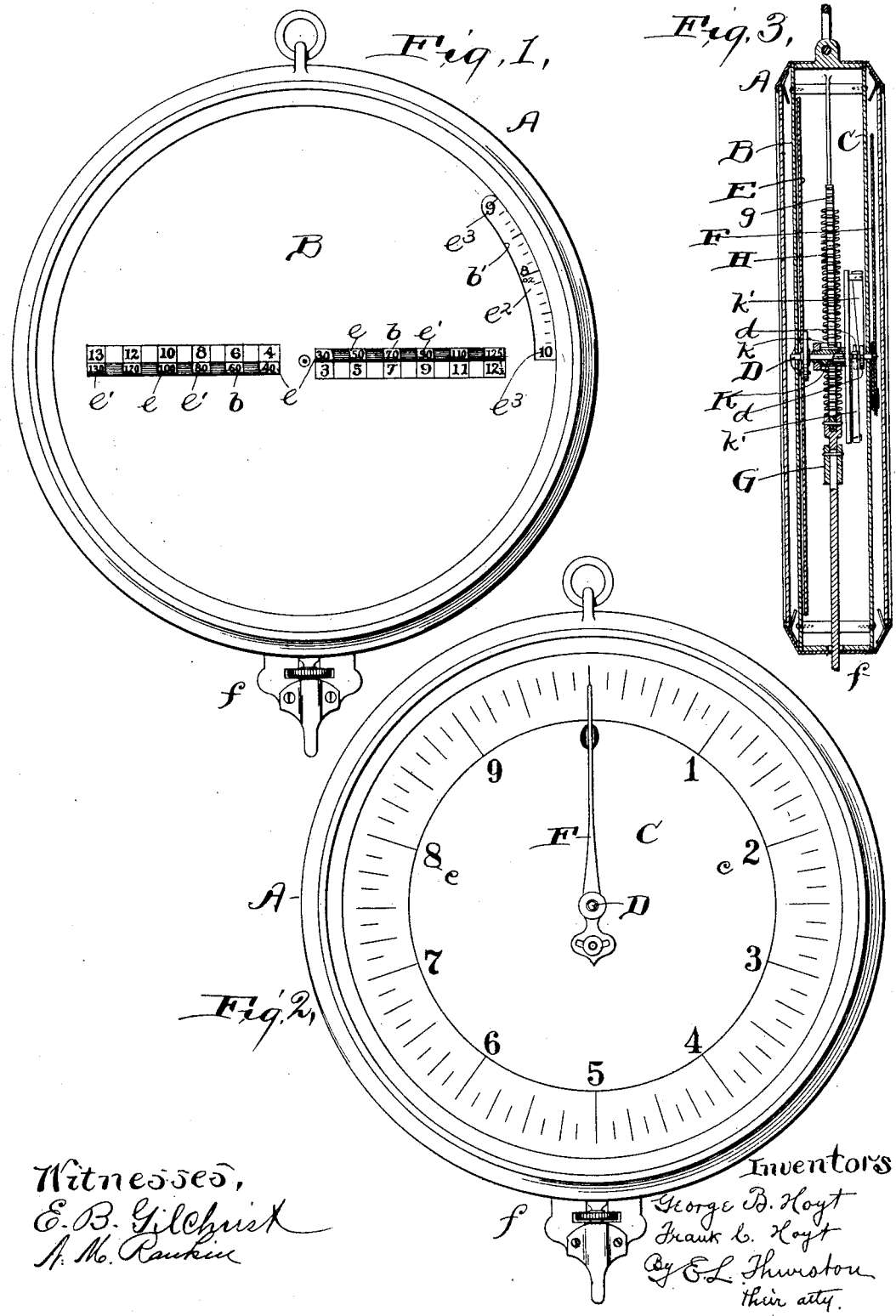
Witnesses,
E. B. Gilchrist
A. M. Rankin
Inventors,
George B. Hoyt
Frank C. Hoyt
By E. L. Thurston
their atty.

UNITED STATES PATENT OFFICE.

GEORGE B. HOYT AND FRANK C. HOYT, OF CLEVELAND, OHIO.

SPRING-BALANCE COMPUTING-SCALE.

SPECIFICATION forming part of Letters Patent No. 588,748, dated August 24, 1897.

Application filed November 24, 1896. Serial No. 613,323. (No model.)

*To all whom it may concern:*

Be it known that we, GEORGE B. HOYT and FRANK C. HOYT, citizens of the United States, residing at Cleveland, in the county of Cuyahoga and State of Ohio, have invented certain new and useful Improvements in Spring-Balance Computing-Scales; and we do hereby declare the following to be a full, clear, and exact description of the invention, such as will enable others skilled in the art to which it appertains to make and use the same.

Our invention relates to an improvement in spring-balance computing-scales, the object being to provide a scale with a novel construction and combination of parts whereby the scale will, on the side which the customer sees, indicate to him the weight of the article he is buying, and on the other side will indicate to the salesman or merchant not only the weight, but also the value at the specified rate per pound. The customer seeing the weight and knowing the rate may calculate the value and to his own satisfaction verify the immediate statement of the value by the merchant or salesman, obtained by reading the value indications which show upon his side of the scale.

In the drawings, Figure 1 is a front view of the scale. Fig. 2 is a rear view thereof, and Fig. 3 is a central vertical sectional view.

Referring to the parts by letter, A represents the scale-casing, having two fixed face-plates B and C, which plates are preferably of circular form.

D represents a transverse shaft, which is journaled in the two face-plates and projects through the rear plate C. On its projecting rear end a pointer F is secured, while the graduated computing-dial E is secured to said shaft inside the casing A and directly behind the front face-plate B.

The front face-plate is provided with one or more sight-openings $b$, having rate-indicating figures along their reading edges, through which the value-indicating graduations and figures upon the dial E may be read, and another sight-opening $b'$, (which may be a continuation or extension of the sight-opening $b$,) through which may be read the weight-indicating marks and figures upon dial E.

The dial E is provided with annular columns $e$ in line with the rate-indicating figures upon the face-plate, which columns severally contain value-indicating figures $e'$ at different rates, and an outer annular column $e^2$, containing weight-indicating marks and figures $e^3$. The specific construction and manner of graduating this movable calculating-dial which the drawings show is not essential to the invention herein claimed.

The face-plate C is graduated and marked to indicate weights, and the position of the pointer F relative to said graduations and marks shows the weight of the article upon the scale-pan.

A frame G is suspended from springs H between the two face-plates, and its end $f$ projects through the bottom of the scale, the scale-pan (not shown) being hung from this projecting end. Suitable mechanism intermediate of this frame and the shaft D is provided, whereby the latter is revolved a distance proportionate to the weight placed upon the scale-pan. The mechanism shown for thus moving the shaft is substantially like that shown in the Swihart patent, No. 535,965, and consists of a sleeve K, loosely mounted upon the shaft D, a pinion $k$, carried by said sleeve, a rack-bar $g$, carried by the frame G, whereby said sleeve is rotated, as described, the heart-shaped cams $d$, secured to shaft D, and the spring-arms $k'$, carried by the sleeve K, which arms press against the peripheries of said cams, whereby the shaft D is compelled to move with or immediately after the sleeve K an equal distance.

Any other mechanism for compelling the shaft to rotate a distance proportionate to the weight upon the scale-pan may be used instead of that shown.

In use the scale is suspended in such manner that the rear face-plate C will be turned toward the customer, while the face-plate B will be turned toward the merchant. A weight placed upon the scale-pan rotates the shaft D proportionately, carrying with it the pointer F and the dial E. The pointer, when it stops, points to that weight-graduation $c$ upon face-plate C which shows the customer the weight of the article. The dial E will then show to the merchant, through the sight-opening $b$ in the face-plate B in line with the proper rate-indicating figure thereon, the value of said article. The merchant will also see the weight through a sight-opening $b'$. The merchant may, as soon as the shaft becomes still, read the weight and value of the article on his side of the scale, while the customer, reading the weight on the rear side of the scale, may, knowing the rate, verify by calculation the merchant's statement as to the value.

Having described our invention, we claim—

1. In a spring-balance computing-scale, in combination, the scale-case, its fixed rear face-plate graduated to indicate weights, its fixed front face-plate having a sight-opening $b$, and rate-indicating figures along the reading edge of the said sight-opening, the transverse shaft projecting through the rear face-plate, a pointer secured to said projecting end of the shaft, and a computing-dial, secured to the shaft behind the front face-plate, and having a plurality of annular columns respectively graduated to indicate values at various rates, and mechanism for actuating said shaft, substantially as and for the purpose specified.

2. In a spring-balance computing-scale, in combination, the scale-case, its fixed rear face-plate graduated to indicate weights, its fixed front plate having sight-openings $b$, along the edge of which rate-indicating figures are placed, and the sight-opening $b'$, the transverse shaft journaled in said face-plates and projecting through the rear face-plate, a pointer secured to said projecting end of the shaft, a computing-dial secured to the shaft behind the front face-plate, having one annular column graduated to indicate weights, and a plurality of annular columns respectively graduated to indicate values at the different rates shown by said rate-indicating figures, a spring-supported frame, and mechanism intermediate of the frame and shaft, substantially as and for the purpose specified.

3. In a spring-balance computing-scale, in combination, the scale-case, its fixed rear plate graduated to indicate weights, its fixed front plate having narrow substantially radial sight-openings $b$, along the edge of which rate-indicating figures are placed, and the arc-shaped sight-opening $b'$, the transverse shaft journaled in said face-plates and projecting through the rear face-plate, a pointer secured to said projecting end of the shaft outside of said rear face-plate, a computing-dial secured to the shaft behind the front face-plate and invisible except at the said sight-openings, having one annular column graduated to indicate weights, and a plurality of annular columns respectively graduated to indicate values at the different rates shown by said rate-indicating figures, the width of the sight-openings $b$ being such as to disclose substantially but one radial row of figures in said annular columns, a spring-supported frame, and mechanism intermediate of the frame and shaft, substantially as and for the purpose specified.

In testimony whereof we affix our signatures in presence of two witnesses.

GEORGE B. HOYT.
FRANK C. HOYT.

Witnesses:
E. L. THURSTON,
E. B. GILCHRIST.